(12) United States Patent
Abo-Hasna et al.

(10) Patent No.: US 7,831,487 B2
(45) Date of Patent: Nov. 9, 2010

(54) METHOD AND SYSTEM FOR SCHEDULING PURCHASE ORDERS

(75) Inventors: Ziad Abo-Hasna, St. Ingbert (DE); Chantal Ullrich, Saarbrücken (DE)

(73) Assignee: SAP AG, Walldorf (DE)

( * ) Notice: Subject to any disclaimer, the term of this patent is extended or adjusted under 35 U.S.C. 154(b) by 1163 days.

(21) Appl. No.: 11/072,000

(22) Filed: Mar. 4, 2005

(65) Prior Publication Data

US 2005/0197921 A1 Sep. 8, 2005

Related U.S. Application Data

(60) Provisional application No. 60/551,221, filed on Mar. 8, 2004, provisional application No. 60/563,284, filed on Apr. 16, 2004.

(51) Int. Cl.
*G06Q 10/00* (2006.01)
(52) U.S. Cl. .................. 705/28; 705/7; 705/10; 705/11; 705/22; 705/26; 705/27; 705/34
(58) Field of Classification Search .................. 705/28
See application file for complete search history.

(56) References Cited

U.S. PATENT DOCUMENTS

| | | | |
|---|---|---|---|
| 4,752,877 A | 6/1988 | Roberts et al. | |
| 5,315,508 A | 5/1994 | Bain et al. | |
| 5,400,253 A | 3/1995 | O'Connor | |
| 5,615,109 A | 3/1997 | Eder | |
| 5,758,327 A | 5/1998 | Gardner et al. | |
| 5,870,716 A | 2/1999 | Sugiyama et al. | |
| 5,930,771 A | 7/1999 | Stapp | |
| 5,999,914 A | 12/1999 | Blinn et al. | |
| 6,029,139 A | 2/2000 | Cunningham et al. | |
| 6,064,984 A | 5/2000 | Ferguson et al. | |
| 6,341,351 B1 | 1/2002 | Muralidhran et al. | |
| 6,473,794 B1 * | 10/2002 | Guheen et al. | 709/223 |
| 6,505,093 B1 | 1/2003 | Thatcher et al. | |
| 6,507,851 B1 | 1/2003 | Fujiwara et al. | |
| 6,701,299 B2 | 3/2004 | Kraisser et al. | |
| 6,725,204 B1 | 4/2004 | Gusley | |

(Continued)

FOREIGN PATENT DOCUMENTS

JP 2004-030343 A 1/2004

(Continued)

OTHER PUBLICATIONS

Der Zee, Durk-Jouke Van; Harten, Aart Van; Schuur, Peter. "On-line scheduling of multi-server batch operations." IIE Transactions, vol. 33, No. 7, p. 569, Jul. 2001.*

(Continued)

*Primary Examiner*—F. Ryan Zeender
*Assistant Examiner*—Fawaad Haider
(74) *Attorney, Agent, or Firm*—Foley & Lardner LLP

(57) ABSTRACT

Systems, methods and program products for monitoring a purchase order are disclosed. The method includes developing one or more timelines for a purchase order. Each timeline includes events in delivery of one or more items in the purchase order from a supplier to a store. The method also includes determining if an event in a timeline has occurred or will occur on schedule, and generating an activity based on the determination.

45 Claims, 6 Drawing Sheets

U.S. PATENT DOCUMENTS

| | | | |
|---|---|---|---|
| 6,868,528 | B2 | 3/2005 | Roberts |
| 6,910,017 | B1 | 6/2005 | Woo et al. |
| 6,980,966 | B1 | 12/2005 | Sobrado et al. |
| 7,080,030 | B2 | 7/2006 | Eglen et al. |
| 7,082,408 | B1 | 7/2006 | Baumann et al. |
| 7,092,929 | B1 | 8/2006 | Dvorak et al. |
| 7,117,165 | B1 | 10/2006 | Adam et al. |
| 7,124,098 | B2 | 10/2006 | Hopson et al. |
| 7,124,984 | B2 | 10/2006 | Yokouchi et al. |
| 7,139,731 | B1 | 11/2006 | Alvin |
| 2001/0019778 | A1 | 9/2001 | Gardaz et al. |
| 2001/0032130 | A1 | 10/2001 | Gabos et al. |
| 2001/0039517 | A1 | 11/2001 | Kawakatsu |
| 2001/0049634 | A1* | 12/2001 | Stewart ............... 705/26 |
| 2002/0013731 | A1 | 1/2002 | Bright et al. |
| 2002/0023500 | A1 | 2/2002 | Chikuan et al. |
| 2002/0026368 | A1 | 2/2002 | Carter, III |
| 2002/0059108 | A1 | 5/2002 | Okura et al. |
| 2002/0072986 | A1 | 6/2002 | Aram |
| 2002/0073114 | A1 | 6/2002 | Nicastro et al. |
| 2002/0078159 | A1 | 6/2002 | Petrogiannis et al. |
| 2002/0107713 | A1 | 8/2002 | Hawkins |
| 2002/0116241 | A1* | 8/2002 | Sandhu et al. ............ 705/7 |
| 2002/0120533 | A1* | 8/2002 | Wiesenmaier ............ 705/27 |
| 2002/0123930 | A1 | 9/2002 | Boyd et al. |
| 2002/0138290 | A1 | 9/2002 | Metcalfe et al. |
| 2002/0147668 | A1 | 10/2002 | Smith et al. |
| 2002/0152128 | A1 | 10/2002 | Walch et al. |
| 2002/0184116 | A1 | 12/2002 | Tam et al. |
| 2003/0023500 | A1 | 1/2003 | Boies et al. |
| 2003/0028393 | A1 | 2/2003 | Coulston et al. |
| 2003/0028437 | A1 | 2/2003 | Grant et al. |
| 2003/0046120 | A1 | 3/2003 | Hoffman et al. |
| 2003/0046195 | A1 | 3/2003 | Mao |
| 2003/0050852 | A1 | 3/2003 | Liao et al. |
| 2003/0074269 | A1 | 4/2003 | Viswanath |
| 2003/0126024 | A1* | 7/2003 | Crampton et al. ............ 705/22 |
| 2003/0144916 | A1 | 7/2003 | Mumm et al. |
| 2003/0149631 | A1 | 8/2003 | Crampton et al. |
| 2003/0149674 | A1* | 8/2003 | Good et al. ............ 705/402 |
| 2003/0158791 | A1 | 8/2003 | Gilberto et al. |
| 2003/0171998 | A1 | 9/2003 | Pujar et al. |
| 2003/0172007 | A1 | 9/2003 | Helmott et al. |
| 2003/0200150 | A1 | 10/2003 | Westcott et al. |
| 2003/0208365 | A1 | 11/2003 | Avery et al. |
| 2003/0229502 | A1 | 12/2003 | Woo |
| 2004/0010463 | A1 | 1/2004 | Hahn-Carlson et al. |
| 2004/0098358 | A1 | 5/2004 | Roediger |
| 2004/0122689 | A1 | 6/2004 | Dailey et al. |
| 2004/0162763 | A1 | 8/2004 | Hoskin et al. |
| 2004/0172321 | A1 | 9/2004 | Vemula et al. |
| 2004/0186765 | A1 | 9/2004 | Kataoka |
| 2004/0186783 | A1 | 9/2004 | Knight et al. |
| 2004/0210489 | A1 | 10/2004 | Jackson et al. |
| 2004/0220861 | A1 | 11/2004 | Morciniec et al. |
| 2004/0267674 | A1 | 12/2004 | Feng et al. |
| 2005/0015303 | A1 | 1/2005 | Dubin et al. |
| 2005/0055283 | A1 | 3/2005 | Zarovinsky |
| 2005/0060270 | A1 | 3/2005 | Ramakrishnan |
| 2005/0075915 | A1 | 4/2005 | Clarkson |
| 2005/0075941 | A1 | 4/2005 | Jetter et al. |
| 2005/0086122 | A1 | 4/2005 | Cirulli et al. |
| 2005/0096963 | A1 | 5/2005 | Myr et al. |
| 2005/0102175 | A1 | 5/2005 | Dudat et al. |
| 2005/0102192 | A1 | 5/2005 | Gerrits et al. |
| 2005/0102227 | A1 | 5/2005 | Solonchev |
| 2005/0165659 | A1 | 7/2005 | Gruber |
| 2005/0171825 | A1 | 8/2005 | Denton et al. |
| 2006/0020512 | A1 | 1/2006 | Lucas et al. |
| 2006/0036507 | A1 | 2/2006 | Pujar et al. |
| 2006/0112099 | A1 | 5/2006 | Musgrove et al. |
| 2007/0050272 | A1 | 3/2007 | Godlewski et al. |

FOREIGN PATENT DOCUMENTS

| | | |
|---|---|---|
| WO | WO 99/45450 A2 | 9/1999 |
| WO | WO 01/71635 A2 | 9/2001 |

OTHER PUBLICATIONS

U.S. Appl. No. 60/374,892, filed Apr. 22, 2002, Krajec.

Abraham et al., "An Implemented System for Improving Promotion Productivity Using Store Scanner Data", Marketing Science, Summer 1993, vol. 12, No. 3, pp. 248-269.

Anon., "(A Lot of) Life After H. Ross: Electronic Data Systems", *Financial World*, vol. 162, No. 22, Nov. 9, 1993 (p. 50(2)).

"Beyond Markdown Management", summer/autumn 03, the 4caster, Issue 4, vol. 2, 4 pages.

Brown, "The Effects of Assortment Composition Flexibility on Operating Efficiency", (Abstract Only), *Dissertation Abstracts Int'l.*, vol. 55/08-A, available at least by 1994, (p. 2458).

"Retailers Manage Markdown Challenges Using i2 Solutions", Jan. 13, 2003, NFR 92nd Annual Convention & Expo, 2 pages.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Jensen et al., "Long-Term Construction Contracts: The Impact of Tamra '88 on Revenue Recognition", *Journal of Construction Education*, Spring 1997, vol. 2, No. 1, pp. 37-53.

Kelkar et al., Price Modeling in Standards for Electronic Product Catalogs Based on XML, 2002, pp. 366-375.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Srinivasan et al., Concepts and strategy guidelines for designing value enhancing sales promotions, Journal of Product and Brand Management, vol. 7, No. 5, 1998, pp. 410-420.

Subrahmanyan et al., "Developing optimal pricing and inventory policies for retailers who face uncertain demand", Journal of Retailing, vol. 72, No. 1, Spring, 1996, 15 pages.

Wilson, "Changing the Process of Production", *Industrial Management*, vol. 37, No. 1, Jan./Feb. 1995 (pp. 1-2).

\* cited by examiner

METHOD AND SYSTEM FOR SCHEDULING PURCHASE ORDERS

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND OF THE INVENTION

The present invention relates generally to the field of systems for and methods of processing purchase orders. More particularly, the present invention relates to systems for and methods of monitoring purchase orders.

One particular business that processes purchase orders is the retail business. Operations for a business often include purchasing merchandise from a supplier for sale to customers or for use in the processes and products for the business. Generally, purchasing merchandise or supplies from the supplier involves sending a purchase order to the supplier requesting a specific number of items for a specific price. The number of items multiplied by the price of the items provides a total cost associated with the purchase order.

Once the purchase order is submitted, the supplier is expected to deliver items in the purchase order pursuant to an estimated schedule. Businesses often submit orders as late as possible to delay the binding of funds as much as possible. Thus, purchase orders are often submitted to schedule delivery as close as possible to the date the items are required. Unfortunately, for delayed deliveries, the business may not become aware of the delay until it is too late.

SUMMARY OF THE INVENTION

One embodiment of the invention relates to a method of monitoring purchase orders. The method includes developing one or more timelines for a purchase order. Each timeline includes events in delivery of one or more items in the purchase order from a supplier to a store or distribution center (DC). The method also includes determining if an event in a timeline has occurred or will occur on schedule, and generating an activity based on the determination.

Another embodiment of the invention relates to a program product for monitoring purchase orders. The program product includes machine-readable program code for causing, when executed, one or more machines to perform the following method steps: developing one or more timelines for a purchase order, each timeline including events in delivery of one or more items in the purchase order from a supplier to a store; determining if an event in a timeline has occurred or will occur on schedule; and generating an activity based on the determination.

Another embodiment of the invention relates to a system for monitoring purchase orders. The system includes a procurement monitoring workbench adapted to develop one or more timelines for a purchase order, each timeline including events in delivery of one or more items in the purchase order from a supplier to a store. The system also includes one or more entities associated with the delivery of the one or more items, each of the entities being in communication with the procurement monitoring workbench. The procurement monitoring workbench is adapted to determine if an event in a timeline has occurred or will occur on schedule. The procurement monitoring workbench is further adapted to generate an activity based on the determination.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION OF CERTAIN EMBODIMENTS

In the following description, for the purposes of explanation, numerous specific details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments.

The disclosed embodiments provide systems and methods for processing purchase orders to allow an entity submitting the purchase order to monitor the status of delivery of one or more items in the purchase order. Thus, the entity can accurately and easily track the delivery status at various points of processing of the purchase order.

In at least one exemplary embodiment illustrated below, a computer system is described which has a central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, multiple workstations, databases, process, or computers can be utilized. In yet other embodiments, hardwired circuitry may be used in place of, or in combination with, software instructions to implement the functions described. Thus, the embodiments described herein are not limited to any particular source for the instructions executed by the computer system.

Figure 1:
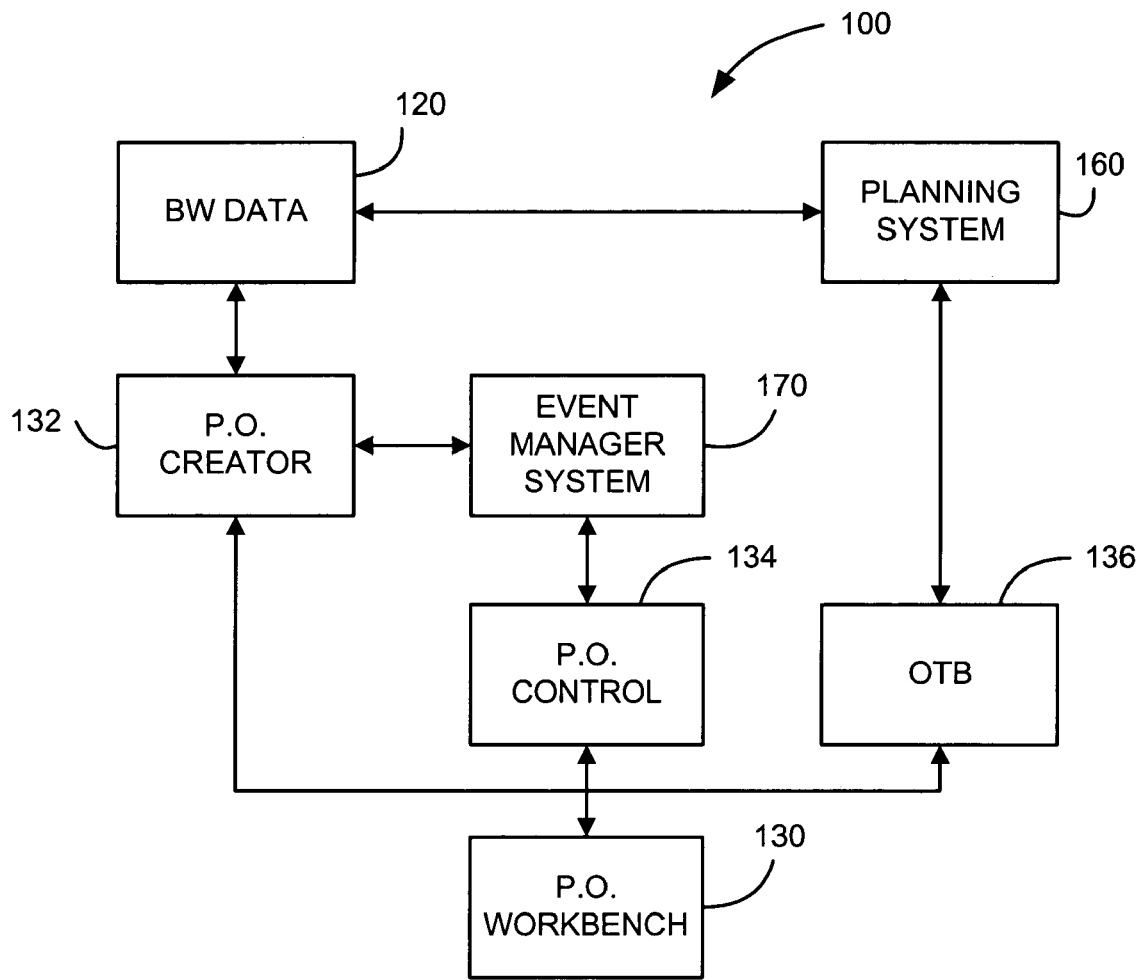
FIG. 1 is a general block diagram illustrating a system for processing data related to retail operations and planning, according to exemplary embodiment.

Referring now to FIG. 1, a general block diagram is shown illustrating an open-to-buy (OTB) system 100 for processing data related to retail operations and planning, according to exemplary embodiment. The OTB system 100 includes a data warehouse 120, a purchase order creator 132, an OTB control system 130 and a purchase order control system 134.

The OTB system 100 may be implemented as a workbench that may be a data processing system or software configured to control, display, interface with operators, or perform other operations to manage purchase orders. The OTB control system 130 is preferably implemented in an SAP-based workbench, interface, and architecture, but any other systems may be utilized.

The OTB system 100 may be implemented as a single system, a distributed system, or any combination thereof. The OTB system 100 may be implemented using a single computing system, a plurality of computing systems, software, hardware, or any other system or combination of systems to perform the functions described herein.

Data warehouse 120 is a data repository configured to receive, sort, and process information related to retail operations and planning. The data warehouse 120 may also be implemented as using a single or multiple systems. The data warehouse 120 may further include one or more functions associated with it to permit a user to efficiently organize and retrieve stored data. The OTB system 100 is sufficiently flexible to accommodate any of a variety of types of data warehouses 120, such as databases, for example.

In certain embodiments, the data warehouse 120 may be adapted to generate rules or checks to be used in the processing of purchase orders. In other embodiments, a planning system 160 may be provided to generate planning data, rules, checks and budgets, and to provide such information to the data warehouse 120. In this regard, the rules or checks may include a planning data or planning budgets including budget buckets corresponding to delivery periods and order periods, for example. The planning data or budgets are provided by the data warehouse 120 to the OTB control system 130, which may be included in a purchase order workbench.

The purchase order workbench may be a data processing system configured to allow a user to create, monitor, and receive approval for purchase orders for obtaining products or other supplies from a supplier. According to an exemplary embodiment, the purchase order creator 132, the purchase order control system 134, and the open-to-buy control system 130 are included in the workbench.

Purchase order creator 132 may be any system or method for creating electronic purchase orders. An electronic purchase order may be any type of purchase order in an electronic format. Purchase order creator 132 may include one or more functions to facilitate creation of the electronic purchase order. For example, purchase order creator 132 may include an auto fill function to automatically populate an electronic purchase order with previously stored data. Additionally, purchase order creator 132 may include a user interface configured to receive and display purchase order information with a user. Upon creation of a purchase order, the purchase order creator 132 provides the purchase order information to the data warehouse 120 for use in future planning or recalculation of planning data or budget. The purchase order information is also provided to the purchase order control system 134. An event manager system 170 may be provided to facilitate communication between the purchase order creator 132 and the purchase order control system 134. The event manager system 170 may receive commands from the purchase order control system 134 to, for example, initiate the creation of a purchase order and may process that command by issuing a command to the purchase order creator 132.

Purchase order control system 134 may be any system for controlling and monitoring electronic purchase orders. Purchase order control system 134 includes one or more functions configured to allow a user to manipulate or receive information related to any existing purchase order. For example, a user may utilize purchase order control system 134 to retrieve information related to a specific purchase order and modify one or more attributes of the retrieved purchase order.

The purchase order control system 134 provides purchase order information to the OTB control system 130, which is configured to facilitate automated approval or rejection of electronic purchase orders including both procurement and budget check functions. The OTB control system 130 receives an electronic purchase order as input and applies one or more rules to the electronic purchase order to determine whether the electronic purchase order should be approved or rejected. The rules, or checks, are based on the planning budget which is based on the planning data received from the data warehouse 120. Planning budgets or buckets may be generated from the planning data at either the data warehouse 120, the OTB control system 130 or in another module lying between the two. According to an exemplary embodiment, the one or more rules includes at least one budget rule. A budget rule may define the amount of money that is available for a purchase order based on information contained in the purchase order. For example, a purchase order may include a time frame for the purchase order, and the rule may be used to define the amount of money that is available in that time frame. According to alternative embodiments, the one or more rules may also include rules directed to the timing during which purchase orders may be requested. In other embodiments, other types of rules may be incorporated into the OTB system 100. The OTB control system 130 will be further discussed below with reference to FIG. 2.

According to alternative embodiments, a purchase order workbench may further include more, fewer, or different systems to facilitate creation, processing, and maintenance of purchase orders. Further, functions associated with one or more systems may alternatively be associated with one or more alternative systems. For example, purchase order creator 132 may be implemented as a component of purchase order control system 134.

Figure 2:
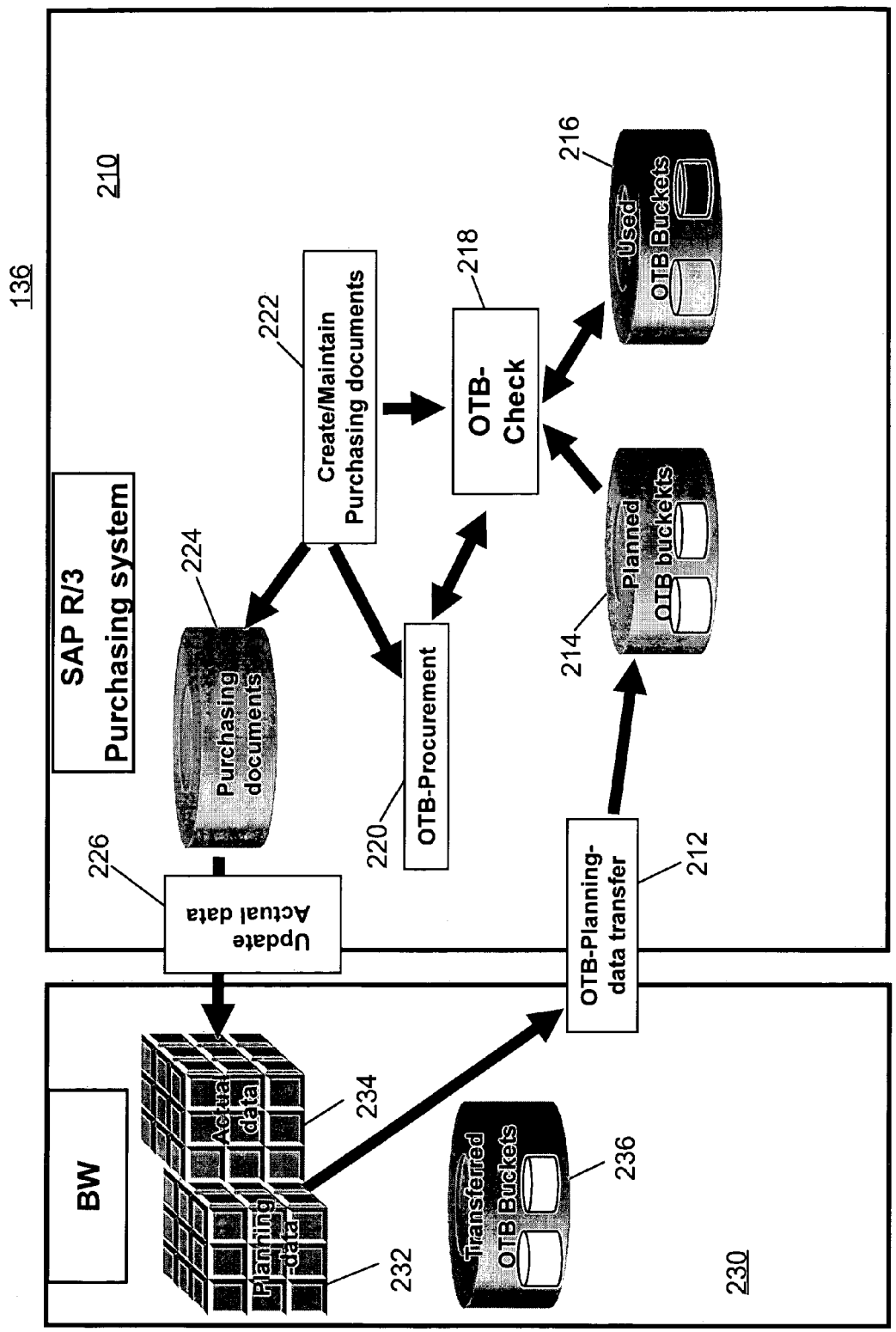
FIG. 2 is a block diagram illustrating an open to buy control system, according to an exemplary embodiment.

Referring now to FIG. 2, a block diagram illustrates open to buy system 136, according to an exemplary embodiment. Open to buy system 136 includes a plurality of components configured to implement one or more functions to facilitate acceptance or rejection of an electronic purchase order. Open to buy system 136 may be implemented as a purchase order processing system.

Open to buy system 136 includes a front-end system 210 configured to provide an interface between one or more users and a back-end system 230, according to an exemplary embodiment. Although shown as separate components, front-end system 210 and back-end system 230 may alternatively be implemented as a single system. Yet further, open to buy system 136 may include a plurality of either front-end systems 210 or back-end systems 230. For example, open to buy system 136 may include a plurality of front-end systems 210 to allow multiple users in distributed locations to access uniform and synchronized information stored on backend system 230.

Further, each of the front-end system 210 and the back-end system 230 may further be configured to each include lower-level front-end and back-end systems. In this regard, one or both of the front-end system 210 and the back-end system 230 may include components which allow user interaction and components which interface with other modules.

Front-end system 210 is configured to allow one or more users to perform functions implemented using open to buy system 136. In the illustrated exemplary embodiment, the front-end system 210 includes a planning-data transfer module 212 adapted to receive data from the back-end system 230. The data received may include, for example, planned budget buckets, sales and budgeting information based on prior experience, current market conditions, and other factors. Additional detail relating to the planning data and its generation is provided below with reference to the description of the back-end system 230.

The planning-data transfer module 212 may generate a budget or a set of budget buckets, or budget portions, based on the planning data received from the back-end system 230. The budget information generated can then be stored in a planned budget module 214. In other embodiments, the planning-data transfer module 212 may receive and transfer raw planning data, and the planned budget module 214 may generated the budget information. In still further embodiments, the budget information may be generated within the back-end system 230 and forwarded to the planned budget module 214 through the planning data transfer module 212.

When a purchase order is received or submitted for processing, the front-end system 210 applies a set of checks or rules to determine whether the order should be processed as submitted. In this regard, the front-end system 210 is provided with an order check module 218. The order check module 218 accesses budget information from the planned budget module 214 to perform the necessary checks.

The order check module 218 may be configured to apply one or more open to buy rules to an electronic purchase order to determine whether the electronic purchase order should be accepted or rejected. A budget rule may be a type of open to buy rule. The order check module 218 may include a currency translation function configured to convert generic financial information to specific financial information relevant to the current user of front-end system 210. Status processing function 218 may be any function configured to determine whether no check was performed, a positive check result was received or a negative check result was received.

If the order check module 218 determines that the purchase order can be processed, the order is forwarded to a procurement module 220, which may communicate, directly or indirectly, over an interface with a user, such as a supplier or a vendor, to place the order. The procurement module 220 may be configured to receive and process information related to the creation, modification, or cancellation of an electronic purchase order.

If, on the other hand, the order check module 218 determines that the rules do not allow the purchase order to be processed as submitted, the order, the rules, the budget or a combination thereof may be modified to allow the processing of the purchase order. In this regard, the procurement module 220 may be configured to procure necessary additional budget (e.g., changing the value, delivery period, etc.) with the support of the purchasing documents creation module 222 or by requesting for a special release of additional budget that allows to overbook the corresponding budget bucket. If enough budget can be obtained within the procurement module 220, the order check module 218 can determine that the order can be processed. This aspect is described in greater detail below with reference to FIGS. 9 and 10. The front-end system 210 may be provided with a used budget module 216 to store budget information that is exhausted by existing purchase orders which may have been updated or revised by the order check module 218.

Once the order has been placed by the purchasing documents creation module 222, a confirmation may be received from the supplier or vendor. The information relating to the placement of the order may be generated by a purchasing documents creation module 222. In this regard, the information may include any revisions to the purchase order required by the order check module 218. The information generated by the purchasing documents creation module 222 may then be stored in a purchasing documents data store 224. In certain embodiments, an actual data transfer module 226 may be provided to supply the actual order and budget information to the back-end system for planning purposes.

According to alternative embodiments, front-end system 210 may include more, fewer, and/or different functions to provide a user interface and perform calculations related to purchase order processing. The described functions may be implemented using hardware, software, integrated circuits or any system configured to perform the functions described herein.

Back-end system 230 is configured to process data, store data, facilitate planning, provide reporting, and provide other functions associated with purchase order management using one or more functions and/or components. The back-end system 230 includes a planning data module 232 adapted to generate a merchandise ordering plan including all planned data (e.g., planned sales, planned margin, planned inventory, planned receipts and planned budget buckets). The merchandise ordering plan may include information relevant to, for example, order scheduling and budgeting. The planning data module 232 may be configured to receive information from at least an order forecasting system and an actual inventory reporting system 234. The order forecasting system (not shown) may include information from various sources, such as industry outlook reports, relating to expected market conditions, for example, The actual inventory reporting system 234 provides information to the planning data module 232 relevant to the actual inventory currently available, which may include expected deliveries. In this regard, the actual inventory reporting system 234 may include information received from the front-end system 210, through the actual data transfer module 226, relating to purchase orders already placed.

In certain embodiments, the planning data module 232 may be adapted to generate budget information. The budget information may be stored within the back-end system 230 in a transferred budget module 236. The transferred budget module 236 may be used to store planned budget buckets that have been released and/or transferred to the planned budget module 214. This may be used to reduce data traffic by requiring transfer of only the changed and new buckets from the planning data module 232 and the transferred budget module 235 to the planned budget module 214.

As noted above, the generation of the budget information from the planning information may be accomplished by either the planning-data module 232, the planning data transfer module 212 or the planned budget module 214 or the transferred budget module 236. In this regard, the budget information may include a budget allocation into a plurality of budget portions, or buckets, each corresponding to, for example, a delivery period, an order period, a merchandise category or a combination thereof.

According to alternative embodiments, backend system 230 may include more, fewer, and/or different functions to provide information and perform calculations related to purchase order processing.

Calculate open to buy rule transferred budget module 236 may be a function configured to generate one or more rules or functions to be applied to an electronic purchase order to determine whether the electronic purchase order should be accepted or rejected.

Front-end system 210 and backend system 230 may be associated with one or more interface calls. An interface call is a message sent between front-end system 210 and back end system 230 or within either system. The interface call may be a request for information, a request for processing, and/or a communication of data. Each interface call may be associated with one or more functions or components within open to buy system 136.

A purchase order processing interface call is a communication from front-end system 210 to back-end system 230 communicating a request for the creation, modification, and/or cancellation of a purchase order. Modifications may include changes to amounts, changes to timing information, or any other modification. Based upon receipt of an interface call, the back-end system 230 is configured to create, modify, and/or cancel a purchase order.

A calculate open to buy rule interface call is a communication from back-end system 230 to front-end system 210 including an open to buy rule to be applied to electronic purchase orders. Based upon receipt of the open to buy rule, is the front-end system 210 can be configured to store the open to buy rule for application to future electronic purchase order requests in, for example, the order check module 218, which may further be configured to perform a validation check on the open to buy rule upon receipt.

An open to buy interface call is a communication from planned budget module 214 to the order check module 218 within the back-end system 230 including planning information to be used in the generation of open to buy rules. The planning budget information may include at least planned receipts, pending purchase orders, open purchase orders, order forecasts, receipts, and the change in end of planning period inventory. Interface call may further include a transfer from order check module 218 to the used budget module 216. The transferred information may include used budget information according to existing purchase orders.

Once a purchase order has been submitted, it is processed to achieve delivery of the items included therein to the submitting entity. In this regard, one or more items in the purchase order are requested to be delivered from a storage location of the supplier, such as a supplier warehouse, to the desired destination, such as a retail outlet or store. During the processing of the purchase order after submission, in an exemplary embodiment of the invention, an OTB procurement monitoring workbench is provided to monitor the processing, or delivery status, of items in the purchase order.

In an exemplary embodiment, the lead time attribute for items of purchase orders can be used for procurement monitoring. In this regard, the planning data module 232 (FIG. 2) may be adapted to provide an anticipated schedule of events during the processing of one or more items in the purchase order. For example, FIG. 3 illustrates an exemplary timeline 300 which may be developed by the OTB procurement monitoring workbench based on data provided by the planning data module 232.

Figure 3:
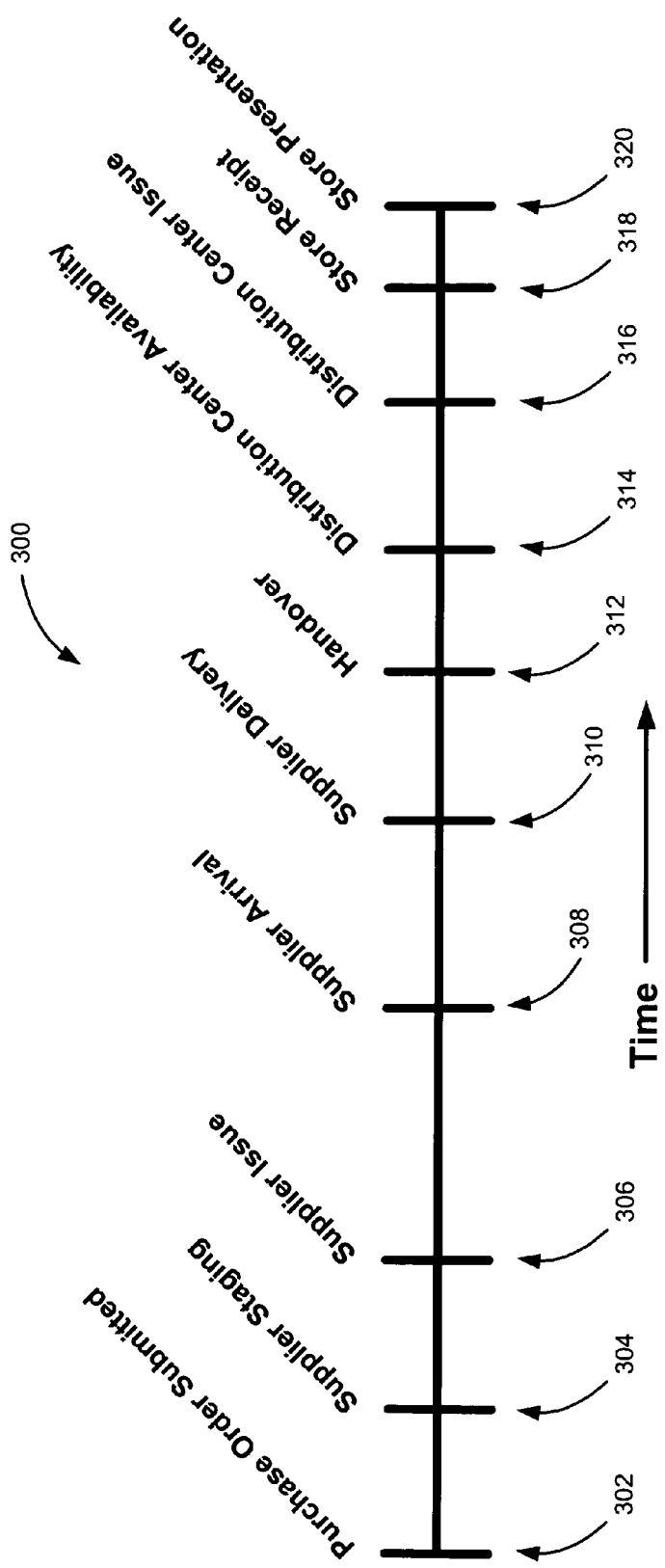
FIG. 3 illustrates an exemplary timeline of events in the processing of an item in a purchase order.

As illustrated in FIG. 3, procurement monitoring starts when the purchase order is created and can be used to track dates and events in the supply chain, from the submission of a purchase order (event 302) to the presentation of the goods in the store (event 320). This monitoring can identify any changes to scheduling and the impacts these could have on storing the goods in the distribution center or on the punctual presentation of the goods in the store. It also serves to introduce measures to ensure that planned activities are carried out on schedule.

The various stages in the exemplary processing of a purchase order for an item are illustrated in the exemplary timeline 300 of FIG. 3. It will be understood by those skilled in the art that a timeline may correspond to one or more items, and one or more timelines may be associated with each purchase order, depending on the number and nature of items included in the purchase order.

Referring now to FIG. 3, the timeline 300 includes a series of events in the processing of the purchase order. The timeline 300 of FIG. 3 illustrates an exemplary set of events, and various embodiments could include a different set of events. In the exemplary timeline 300, after the submission of the purchase order (event 302), the next event is the supplier staging event 304, corresponding to the date from which the item can be delivered by the supplier. The supplier staging date 304 may correspond to the receiving of the purchase order by the supplier's warehouse, for example.

Next, the supplier issue event 306 corresponds to the date on which the item leaves the location at which the main transportation of the item starts. This location may be a shipping terminal for the supplier, for example. The main transportation is generally the most time-consuming segment of the processing of the item in the purchase order.

The supplier arrival event 308 corresponds to the date on which the main transportation ends, such as arrival of the item at a destination port of the supplier, for example. Following the supplier arrival event 308, the item may be delivered to a delivery point designated by the entity submitting the purchase order. This delivery corresponds to the supplier delivery event 310 of the timeline 300 and may indicate delivery to a distribution center of the ordering entity.

A handover event 312 indicates the date on which the risk for the item switches from the supplier to the ordering entity. Although the handover event 312 is shown as a separate event on the timeline 300, in practice, the handover event 312 may not be a separate date, but rather correspond to another event. For example, the handover may occur at the supplier delivery event 310 or another event agreed to by the parties.

A distribution center availability event 314 indicates a date on which the item is either stored in the distribution center or is available to the stores for further transportation. Next, the date on which the item leaves the distribution center for delivery to the store may correspond to a distribution center issue event 316.

The date on which the item arrives in the store corresponds to the store receipt event 318. Once the store has received the item, it can be presented on the store's retail selling area. The date or presentation of the item on the selling area corresponds to the store presentation event 320.

Based on historic data, for example, an estimated timeline may be developed for one or more items in the purchase order. As noted above, multiple timelines may be developed for each purchase order, each timeline corresponding to one or more items in the purchase order. A monitoring system may then use the estimated timelines to monitor whether delivery of an item can be expected on time, early or late. Embodiments of such monitoring systems are illustrated in FIGS. 4A and 4B.

Figure 4A:
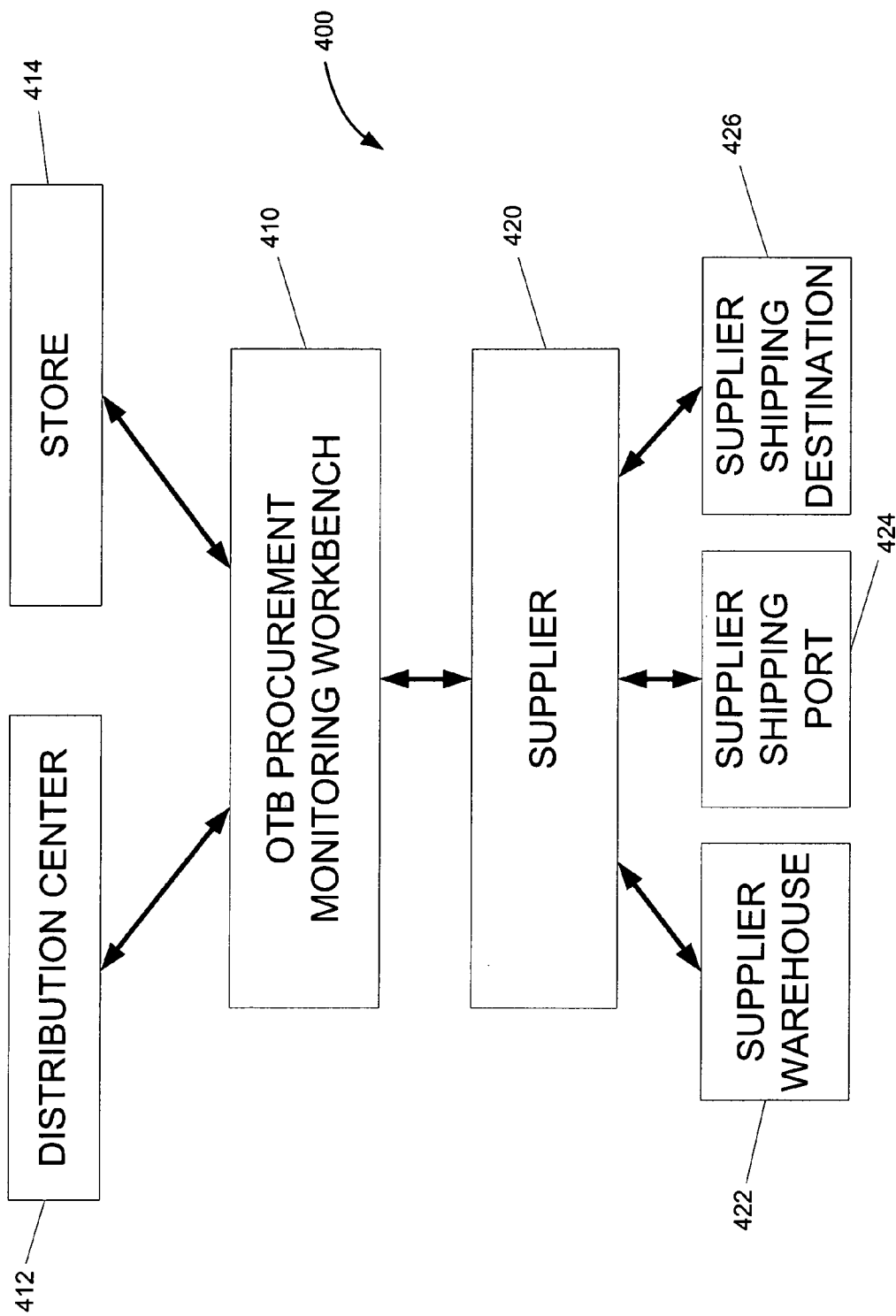
FIG. 4A is a schematic illustration of a purchase order monitoring system according to an exemplary embodiment.
Figure 4B:
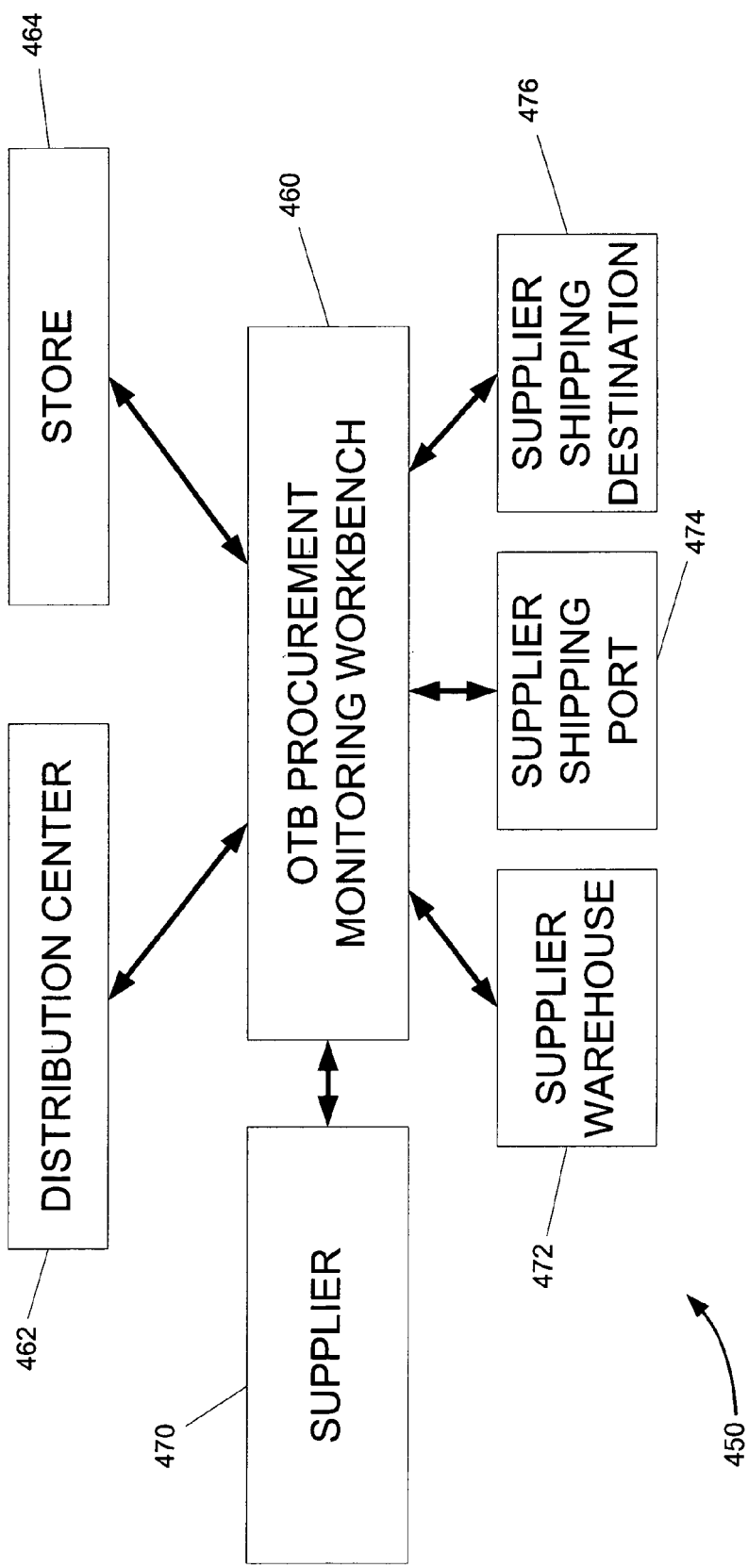
FIG. 4B is a schematic illustration of a purchase order monitoring system according to another exemplary embodiment.

Referring now to FIG. 4A, a block diagram schematically illustrates a purchase order monitoring system 400 for monitoring purchase orders, according to an exemplary embodiment. Purchase order monitoring system 400 includes an OTB procurement monitoring workbench 410 adapted to monitor the processing of a purchase order. The OTB procurement monitoring workbench 410 is adapted to communicate with various entities associated with the processing of the purchase order. In one embodiment, the OTB procurement monitoring workbench 410 is implemented within the OTB procurement module 220 illustrated in FIG. 2 above. In other embodiments, the OTB procurement monitoring module 410 is implemented as a separate module adapted to communicate with various components of the open-to-buy system 136 described above with reference to FIG. 2.

According to an exemplary embodiment, the OTB procurement monitoring workbench 410 may be implemented using a single computing system. Accordingly, the OTB procurement monitoring workbench 410 may be any type of computing device, including work stations, laptops, notebooks, personal digital assistants (PDAs), or other equipment configured to receive input, store data in a memory, execute a series of instructions, and provide an output. The OTB procurement monitoring workbench 410 may include a processor configured to execute a set instructions or computer program, such as an Intel® PENTIUM® processor sold by Intel Corp. of Santa Clara, Calif.

The OTB procurement monitoring workbench 410 may communicate with the various components of the purchase order monitoring system 400 through, for example, a communication network. According to an exemplary embodiment, the communication network may be the Internet. According to alternative embodiments, the communication network may be any other type of network, such as a virtual private network (VPN), an Ethernet, or a Netware network. Further, the network can include a configuration, such as, a wide area network (WAN) or a local area network (LAN).

The OTB procurement workbench 410 can communicate with various entities along the delivery chain of a product, as illustrated by the timeline of FIG. 3. Thus, the OTB procurement monitoring workbench 410 can communicate with the distribution center 412 to determine the status of certain events on the timeline, such as supplier delivery event 310, the distribution center availability event 314 and the distribution center issue event 316. Similarly, the OTB procurement monitoring workbench 410 can communicate with the store 414 to determine the status of store-related events, such as the store receipt event 318 and the store presentation event 320.

In the embodiment of FIG. 4A, the OTB procurement monitoring workbench 410 is able to communicate with the supplier 420 to determine the status of supplier-related events. In this regard, the supplier 420 may be able to communicate with various supplier-related entities to obtain status and relay the information to the OTB procurement monitoring workbench 410. For example, the supplier 420, or a central server thereof, can communicate with the supplier warehouse 422 to obtain status of the supplier staging event 304, for example. Similarly the supplier 420 can communicate with the supplier shipping port 424 to obtain the status of the supplier issue event 306 and with the supplier shipping destination 426 to obtain status of the supplier arrival event 308.

In other embodiments, such as that illustrated in FIG. 4B, a purchase order monitoring system 450 may include an OTB procurement monitoring workbench 460 adapted to communicate with a distribution center 462 and a store 464. Additionally, the OTB procurement monitoring workbench 460 is adapted to communicate with certain supplier-related entities directly. For example, the OTB procurement monitoring workbench 460 may obtain status of the supplier staging event 304, the supplier issue event 306 and the supplier arrival event 308 by communicating a status request directly to a supplier warehouse 472, a supplier shipping port 474 and a supplier shipping destination 476, respectively. Further, the OTB procurement monitoring workbench 460 may be adapted to communicate with a supplier 470, or a central server thereof, for example.

Figure 5:
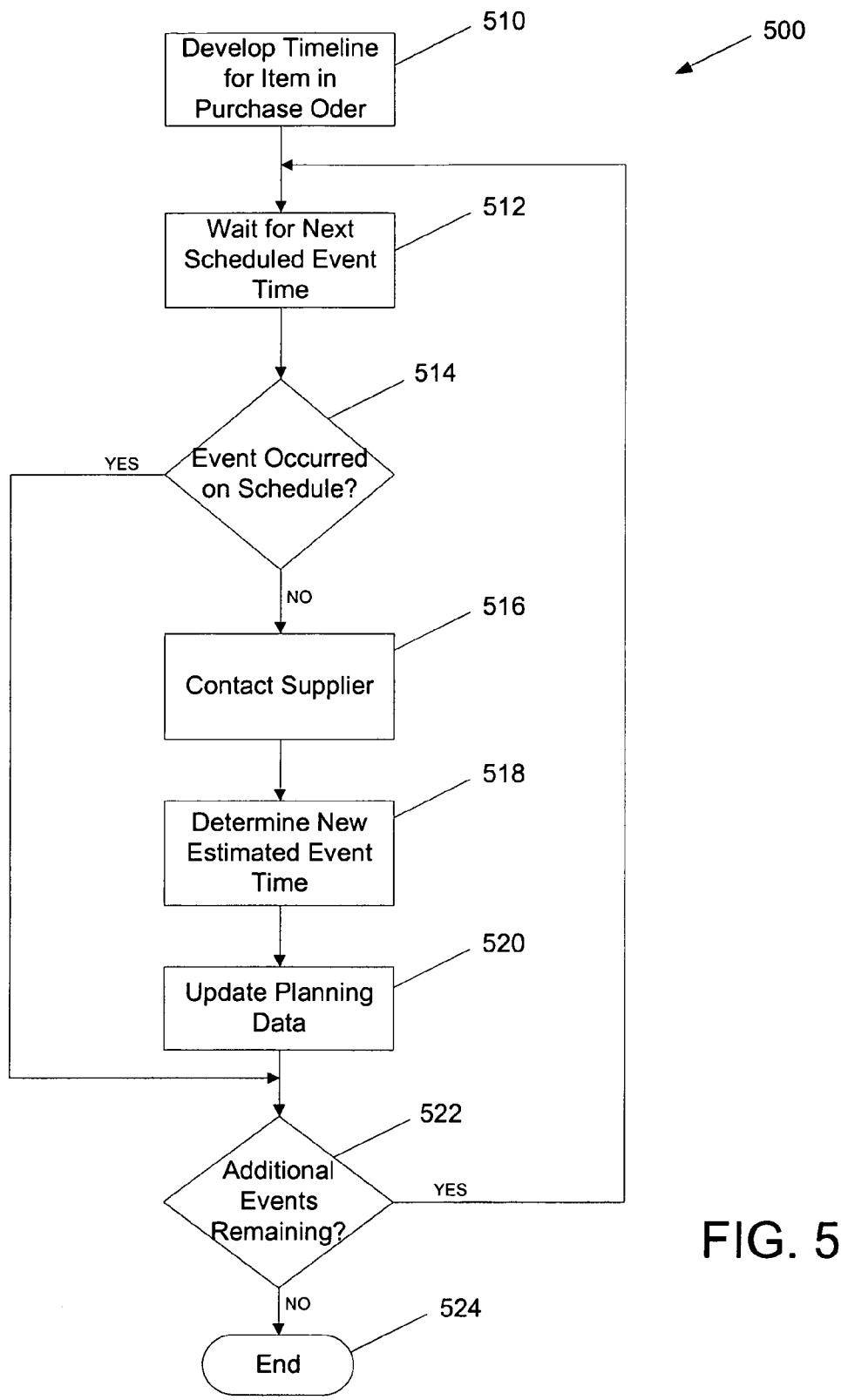
FIG. 5 is a flow chart illustrating a method for monitoring electronic purchase orders, according to an exemplary embodiment.

FIG. 5 illustrates an exemplary process for monitoring a purchase order, according an embodiment of the invention. The process 500 starts once the purchase order has been submitted. Upon submission of the purchase order, the OTB procurement monitoring workbench may develop one or more timelines associated with the purchase order (block 510). As noted above, each purchase order may be associated with one or more timelines, and each timeline may be associated with one or more items in the purchase order. The process 500 illustrated in FIG. 5 relates to a single timeline. It will be understood by those skilled in the art that, in the case of multiple timelines associated with a single purchase order, the process 500 may be carried out in parallel for each such timeline. Each timeline indicates an estimated schedule of events in the delivery process, as described above with reference to FIG. 3.

Referring again to FIG. 5, at block 512, the process 500 waits for the next scheduled event in the timeline. In this regard, the OTB procurement monitoring workbench may be adapted to wait until a predetermined amount of time before or after the scheduled occurrence of an event. For example, the process may hold at block 512 until one day after the scheduled time for the event. In some embodiments, the process may release the hold prior to the scheduled occurrence of the event.

At block 514, the OTB procurement monitoring workbench determines whether the next event in the timeline occurred on schedule. In this regard, the OTB procurement monitoring workbench may submit a status request to the supplier or a supplier entity, such as the supplier warehouse, the supplier shipping port or the supplier shipping destination. If the event is after the delivery of the item from the supplier to the distribution center, for example, the OTB procurement monitoring workbench may submit a status request to the distribution center or the store. In other embodiments, rather than submitting a request, a pre-determined arrangement may be made for the OTB procurement monitoring workbench to receive a signal upon the occurrence, or the anticipated occurrence, of the event. The signal may take the form of an electronic mail message, for example. In this regard, if the OTB procurement monitoring workbench does not receive the signal at the expected time, it may determine that the event did not, or will not, occur on schedule.

If the determination at block 514 is made that the event did occur or will occur on schedule, the process proceeds to block 522. On the other hand, if the determination at block 514 indicates that the event did not or will not occur on schedule, the OTB procurement monitoring workbench generates one or more activities to be executed. For example, as illustrated in FIG. 5, the OTB procurement monitoring workbench may contact an entity, such as the supplier (block 516). In this regard, the OTB procurement monitoring workbench may signal to the supplier a desire to cancel at least a portion of the purchase order, for example. In other embodiments, the OTB procurement monitoring workbench may signal the store to update or revise a store presentation plan, for example, to account for delays in the delivery of one or more items.

Other activities generated by the OTB procurement monitoring workbench may include determining a new estimated schedule of events (block 518). In this regard, the OTB procurement monitoring workbench may query the supplier or other entity as to an expected or an actual date of occurrence of the event. Further, the OTB procurement monitoring workbench may update the planning data (block 520) with the updated event occurrence information to facilitate development of more accurate timelines in the future. In this regard, the OTB procurement monitoring workbench may update a database of historical data relating to schedules and delivery events.

At block 522, the OTB procurement monitoring workbench determines whether additional events remain on the timeline. If additional events remain, the process 500 returns to block 512 and waits for the next scheduled event. On the other hand, if the OTB procurement monitoring workbench determines, at block 522, that no additional events remain, the process terminates (block 524).

Thus, embodiments of the invention provide for monitoring of the processing of purchase orders. Procurement monitoring in accordance with at least one embodiment of the invention allows one to carry out measures to avoid possible delayed deliveries or coordinate the impacts of a delayed delivery on subsequent processes. For example, one can utilize procurement management at any stage to find out about ongoing procurement processes in the supply chain. This allows one to intervene in the procurement process, for example by cancelling purchase orders.

In certain embodiments, the handover date (for example, the delivery date) may be monitored as a reminder procedure date. In this regard, the OTB procurement monitoring workbench may transmit a reminder signal to the distribution center to remind the distribution center of an upcoming scheduled event. A procurement monitoring database of historical data may be used to control whether a purchase order will be proposed for a reminder. That database may also be used to determine whether the reminder will be created automatically or manually by a user.

If a delay occurs for an event in obtaining items in a purchase order, subsequent event dates can be moved either automatically or manually, based on the actual date of occurrence of the delayed event. The OTB procurement monitoring workbench may recalculate the subsequent dates based on this date shift. The number of date shifts will be recorded and updated in the procurement monitoring database.

Changes to dates will result in the scheduling bar being updated in the procurement monitoring database, so that the monitoring of new dates in the database will have to be triggered again. The procurement monitoring system can be used to control whether a purchase order will be proposed for a date shift. The procurement monitoring data can also be used to determine whether the date shift will be carried out automatically or manually. If a purchase order is proposed for a manual date shift, the user will be have the option of not carrying out a date shift, or to create a reminder in addition to the date shift.

Many other changes and modifications may be made to the present invention without departing from the spirit thereof. The scope of these and other changes will become apparent from the appended claims.

What is claimed is:

1. Machine-readable non-transitory media for monitoring purchase orders using an automated process, the machine-readable media comprising program code stored therein for monitoring purchase orders, the automated process comprising: generating a purchasing plan, the purchasing plan comprising a plurality of items, the plurality of items comprising at least a first product, a second product, and a third product, the purchasing plan further comprising a first product cost, and a second product cost, the first product cost is a cost of the first product times a first product quantity, the second product cost is a cost of the second product times a second product quantity; generating a first purchase order based on a first product budget exceeding the first product cost; generating a second purchase order based on a second product budget exceeding the second product cost; developing one or more timelines for the first purchase order and the second purchase order, each timeline including events in delivery of one or more items in the purchase order from a supplier to a store; generating a first product timeline, the first product timeline comprising a first plurality of events, the first plurality of events comprising at least a first event, a second event, and a third event; generating a second product timeline, the second product timeline comprising a second plurality of events, the second plurality of events comprising at least a fourth event, a fifth event, and a sixth event; determining if an event in the first product timeline and the second product timeline has occurred or will occur on schedule by comparing at least one of a first event date to an actual date, a second event date to the actual date, a third event date to the actual date, a fourth event date to the actual date, a fifth event date to the actual date, and a sixth event date to the actual date; transmitting a status request to a vendor based on determining if an event in the first product timeline and the second product timeline has occurred or will occur on schedule; generating at least one of a first exception based on the actual date exceeding the first event date, a second exception based on the actual date exceeding the second event date, a third exception based on the actual date exceeding the third event date, a fourth exception based on the actual date exceeding the fourth event date, a fifth exception based on the actual date exceeding the fifth event date, and a sixth exception based on the actual date exceeding the sixth event date; generating an activity to be executed based on at least one of the first exception, the second exception, the third exception, the fourth exception, the fifth exception, and the sixth exception; transmitting at least the first purchase order to a first vendor and the second purchase order to a second vendor and receiving at least a first confirmation from the first vendor and a second confirmation from the second vendor; and storing at least one of the purchasing plan, the first product budget, the second product budget, the first purchase order, the second purchase order, the first product cost, the second product cost, the first product timeline, the second product timeline, the first event, the second event, the third event, the fourth event, the fifth event, the sixth event, the first event date, the second event date, the third event date, the fourth event date, the fifth event date, the sixth event date, the first exception, the second exception, the third exception, the fourth exception, the fifth exception, and the sixth exception.

2. The machine-readable media of claim 1, further comprising:

transmitting a status request signal to at least one of the first vendor and the second vendor based on at least one of the first exception, the second exception, the third exception, the fourth exception, the fifth exception, and the sixth exception;

receiving at least one of a first product status and a second product status from at least one of the first vendor and the second vendor;

modified at least one of the first product timeline and the second product timeline based on at least one of the first product status and the second product status; and storing at least one of the first product status, the second product status, a modified first product timeline, and a second modified product timeline.

3. The machine-readable media of claim 2, further comprising transmitting a cancellation request to at least one of the first vendor and the second vendor based on at least one of the first exception, the second exception, the third exception, the fourth exception, the fifth exception, and the sixth exception, wherein the cancellation request cancels at least one of a portion of the first purchase order and a portion of the second purchase order.

4. The machine-readable media of claim 2, further comprising transmitting a revised store presentation plan based on at least one of the first exception, the second exception, the third exception, the fourth exception, the fifth exception, and the sixth exception.

5. The machine-readable media of claim 2, further comprising updating a schedule and delivery events database based on at least one of the first exception, the second exception, the third exception, the fourth exception, the fifth exception, and the sixth exception.

6. The machine-readable media of claim 2, further comprising generating and transmitting an exception report based on at least one of the first exception, the second exception, the third exception, the fourth exception, the fifth exception, and the sixth exception.

7. The machine-readable media of claim 1, further comprising:
   transmitting a status request signal to at least one of a distribution center and a store based on an exception;
   receiving at least one of a first product status and a second product status from at least one of the distribution center and the store;
   modified at least one of the first product timeline and the second product timeline based on at least one of the first product status and the second product status; and
   storing at least one of the first product status, the second product status, a modified first product timeline, and a second modified product timeline.

8. The machine-readable media of claim 1, wherein the purchasing plan is based at least in part on an industry report.

9. The machine-readable media of claim 1, further comprising generating a handover status based on a risk of at least one of the first product and the second product being transferred from at least one of a first vendor and a second vendor to a purchaser.

10. The machine-readable media of claim 1, further comprising:
    transmitting at least the first purchase order to a first vendor and the second purchase order to a second vendor and receiving at least a first confirmation from the first vendor and a second confirmation from the second vendor;
    transmitting a status request signal to at least one of the first vendor and the second vendor based on at least one of the first exception, the second exception, the third exception, the fourth exception, the fifth exception, and the sixth exception;
    receiving at least one of a first product status and a second product status from at least one of the first vendor and the second vendor;
    modified at least one of the first product timeline and the second product timeline based on at least one of the first product status and the second product status;
    transmitting a cancellation request to at least one of the first vendor and the second vendor based on at least one of the first exception, the second exception, the third exception, the fourth exception, the fifth exception, and the sixth exception, wherein the cancellation request cancels at least one of a portion of the first purchase order and a portion of the second purchase order;
    transmitting a revised store presentation plan based on at least one of the first exception, the second exception, the third exception, the fourth exception, the fifth exception, and the sixth exception;
    updating a schedule and delivery events database based on at least one of the first exception, the second exception, the third exception, the fourth exception, the fifth exception, and the sixth exception;
    generating and transmitting an exception report based on at least one of the first exception, the second exception, the third exception, the fourth exception, the fifth exception, and the sixth exception;
    generating a handover status based on a risk of at least one of the first product and the second product being transferred from at least one of the first vendor and the second vendor to a purchaser; and
    storing at least one of the first product status, the second product status, a modified first product timeline, and a second modified product timeline.

11. The machine-readable media of claim 1, wherein the step of determining if an event in the first product timeline and the second product timeline has occurred or will occur on schedule includes transmitting a status request to a supplier entity associated with the supplier.

12. The machine-readable media of claim 1, wherein the step of determining if an event in the first product timeline and the second product timeline has occurred or will occur on schedule includes receiving a status from a supplier entity associated with the supplier.

13. The machine-readable media of claim 1, wherein the step of determining if an event in the first product timeline and the second product timeline has occurred or will occur on schedule includes determining an event did not or will not occur on schedule upon not receiving an expected status from a supplier entity associated with the supplier.

14. The machine-readable media of claim 1, wherein the step of developing one or more timelines includes using a database of historic data to estimate dates of events.

15. The machine-readable media of claim 14, further comprising updating the database of historic data when at least one event did not or will not occur on schedule.

16. The machine-readable media of claim 15, wherein the updating the database includes determining an updated date for the occurrence of the event.

17. The machine-readable media of claim 1, further comprising contacting a supplier entity when at least one event did not or will not occur on schedule.

18. The machine-readable media of claim 17, wherein the contacting the supplier entity includes sending an electronic mail message.

19. The machine-readable media of claim 17, wherein the contacting the supplier entity includes canceling at least a portion of the purchase order.

20. The machine-readable media of claim 1, further comprising contacting the store when at least one event did not or will not occur on schedule.

21. The machine-readable media of claim 20, wherein the contacting the store includes updating a store presentation plan.

22. A program product for monitoring a purchase order, comprising a machine-readable non-transitory media having machine-readable program code for causing, when executed, one or more machines to perform the following method steps:

generating a purchasing plan, the purchasing plan comprising a plurality of items, the plurality of items comprising at least a first product, a second product, and a third product, the purchasing plan further comprising a first product cost, and a second product cost, the first product cost is a cost of the first product times a first product quantity, the second product cost is a cost of the second product times a second product quantity; generating a first purchase order based on a first product budget exceeding the first product cost; generating a second purchase order based on a second product budget exceeding the second product cost; developing one or more timelines for the first purchase order and the second purchase order, each timeline including events in delivery of one or more items in the purchase order from a supplier to a store; generating a first product timeline, the first product timeline comprising a first plurality of events, the first plurality of events comprising at least a first event, a second event, and a third event; generating a second product timeline, the second product timeline comprising a second plurality of events, the second plurality of events comprising at least a fourth event, a fifth event, and a sixth event; determining if an event in the first product timeline and the second product timeline has occurred or will occur on schedule by comparing at least one of a first event date to an actual date, a second event date to the actual date, a third event date to the actual date, a fourth event date to the actual date, a fifth event date to the actual date, and a sixth event date to the actual date; transmitting a status request to a vendor based on determining if an event in the first product timeline and the second product timeline has occurred or will occur on schedule; generating at least one of a first exception based on the actual date exceeding the first event date, a second exception based on the actual date exceeding the second event date, a third exception based on the actual date exceeding the third event date, a fourth exception based on the actual date exceeding the fourth event date, a fifth exception based on the actual date exceeding the fifth event date, and a sixth exception based on the actual date exceeding the sixth event date; generating an activity to be executed based on at least one of the first exception, the second exception, the third exception, the fourth exception, the fifth exception, and the sixth exception; transmitting at least the first purchase order to a first vendor and the second purchase order to a second vendor and receiving at least a first confirmation from the first vendor and a second confirmation from the second vendor; and storing at least one of the purchasing plan, the first product budget, the second product budget, the first purchase order, the second purchase order, the first product cost, the second product cost, the first product timeline, the second product timeline, the first event, the second event, the third event, the fourth event, the fifth event, the sixth event, the first event date, the second event date, the third event date, the fourth event date, the fifth event date, the sixth event date, the first exception, the second exception, the third exception, the fourth exception, the fifth exception, and the sixth exception.

23. The program product of claim 22, wherein the step of determining if an event in the first product timeline and the second product timeline has occurred or will occur on schedule includes transmitting a status request to a supplier entity associated with the supplier.

24. The program product of claim 22, wherein the step of determining if an event in the first product timeline and the second product timeline has occurred or will occur on schedule includes receiving a status from a supplier entity associated with the supplier.

25. The program product of claim 22, wherein the step of determining if an event in the first product timeline and the second product timeline has occurred or will occur on schedule includes determining an event did not or will not occur on schedule upon not receiving an expected status from a supplier entity associated with the supplier.

26. The program product of claim 22, wherein the step of developing one or more timelines includes using a database of historic data to estimate dates of events.

27. The program product of claim 26, further comprising updating the database of historic data when at least one event did not or will not occur on schedule.

28. The program product of claim 27, wherein the updating the database includes determining an updated date for the occurrence of the event.

29. The program product of claim 22, further comprising contacting a supplier entity when at least one event did not or will not occur on schedule.

30. The program product of claim 29, wherein the contacting the supplier entity includes sending an electronic mail message.

31. The program product of claim 29, wherein the contacting the supplier entity includes canceling at least a portion of the purchase order.

32. The program product of claim 22, further comprising contacting the store when at least one event did not or will not occur on schedule.

33. The program product of claim 32, wherein the contacting the store includes updating a store presentation plan.

34. A system of monitoring purchase orders, comprising:
means for generating a purchasing plan, the purchasing plan comprising a plurality of items, the plurality of items comprising at least a first product, a second product, and a third product, the purchasing plan further comprising a first product cost, and a second product cost, the first product cost is a cost of the first product times a first product quantity, the second product cost is a cost of the second product times a second product quantity;
means for generating a first purchase order based on a first product budget exceeding the first product cost;
means for generating a second purchase order based on a second product budget exceeding the second product cost;
means for developing one or more timelines for the first purchase order and the second purchase order, each timeline including events in delivery of one or more items in the purchase order from a supplier to a store;
means for generating a first product timeline, the first product timeline comprising a first plurality of events, the first plurality of events comprising at least a first event, a second event, and a third event;
means for generating a second product timeline, the second product timeline comprising a second plurality of events, the second plurality of events comprising at least a fourth event, a fifth event, and a sixth event;
means for determining if an event in the first product timeline and the second product timeline has occurred or will occur on schedule by comparing at least one of a first event date to an actual date, a second event date to the actual date, a third event date to the actual date, a fourth event date to the actual date, a fifth event date to the actual date, and a sixth event date to the actual date;

means for transmitting a status request to a vendor based on determining if an event in the first product timeline and the second product timeline has occurred or will occur on schedule;

means for generating at least one of a first exception based on the actual date exceeding the first event date, a second exception based on the actual date exceeding the second event date, a third exception based on the actual date exceeding the third event date, a fourth exception based on the actual date exceeding the fourth event date, a fifth exception based on the actual date exceeding the fifth event date, and a sixth exception based on the actual date exceeding the sixth event date;

means for generating an activity to be executed based on at least one of the first exception, the second exception, the third exception, the fourth exception, the fifth exception, and the sixth exception;

means for transmitting at least the first purchase order to a first vendor and the second purchase order to a second vendor and receiving at least a first confirmation from the first vendor and a second confirmation from the second vendor; and means for storing at least one of the purchasing plan, the first product budget, the second product budget, the first purchase order, the second purchase order, the first product cost, the second product cost, the first product timeline, the second product timeline, the first event, the second event, the third event, the fourth event, the fifth event, the sixth event, the first event date, the second event date, the third event date, the fourth event date, the fifth event date, the sixth event date, the first exception, the second exception, the third exception, the fourth exception, the fifth exception, and the sixth exception.

35. The system of claim 34, wherein the means for determining is adapted to transmit a status request to a supplier entity associated with the supplier.

36. The system of claim 34, wherein the means for determining is adapted to receive a status from a supplier entity associated with the supplier.

37. The system of claim 34, wherein the means for determining is adapted to determine an event did not or will not occur on schedule upon not receiving an expected status from a supplier entity associated with the supplier.

38. The system of claim 34, wherein the means for developing one or more timelines is adapted to use a database of historic data to estimate dates of events.

39. The system of claim 38, wherein the means for generating an activity is adapted to update the database of historic data when the means for determining determines an event did not or will not occur on schedule.

40. The system of claim 39, wherein the updating the database includes determining an updated date for the occurrence of the event.

41. The system of claim 34, wherein the means for generating an activity is adapted to contact a supplier entity when the means for determining determines an event did not or will not occur on schedule.

42. The system of claim 41, wherein the contacting the supplier entity includes sending an electronic mail message.

43. The system of claim 41, wherein the contacting the supplier entity includes canceling at least a portion of the purchase order.

44. The system of claim 34, wherein the means for generating an activity is adapted to contact the store when the means for determining determines an event did not or will not occur on schedule.

45. The system of claim 44, wherein contacting the store includes updating a store presentation plan.

* * * * *